United States Patent
Zhang et al.

(10) Patent No.: US 11,750,313 B2
(45) Date of Patent: Sep. 5, 2023

(54) CLIENT SIGNAL TRANSMISSION METHOD, DEVICE AND SYSTEM AND COMPUTER-READABLE STORAGE MEDIUM

(71) Applicant: ZTE CORPORATION, Guangdong (CN)

(72) Inventors: Yuanbin Zhang, Guangdong (CN); Yan Yuan, Guangdong (CN); Song Chen, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 100 days.

(21) Appl. No.: 17/426,142

(22) PCT Filed: Jan. 19, 2020

(86) PCT No.: PCT/CN2020/073032
§ 371 (c)(1),
(2) Date: Jul. 28, 2021

(87) PCT Pub. No.: WO2020/156287
PCT Pub. Date: Aug. 6, 2020

(65) Prior Publication Data
US 2022/0103282 A1    Mar. 31, 2022

(30) Foreign Application Priority Data
Jan. 28, 2019    (CN) .......................... 201910080754.5

(51) Int. Cl.
*H04J 14/00*    (2006.01)
*H04J 3/16*    (2006.01)

(52) U.S. Cl.
CPC ..... *H04J 3/1664* (2013.01); *H04J 2203/0098* (2013.01)

(58) Field of Classification Search
None
See application file for complete search history.

(56) References Cited

U.S. PATENT DOCUMENTS

| | | |
|---|---|---|
| 8,340,134 B1 | 12/2012 | Gorshe |
| 2007/0211750 A1* | 9/2007 | Li ........................... H04L 45/60 370/445 |

(Continued)

FOREIGN PATENT DOCUMENTS

| | | |
|---|---|---|
| CN | 1791057 A | 6/2006 |
| CN | 101325465 A | 12/2008 |

(Continued)

OTHER PUBLICATIONS

International Search Report for the International Patent Application No. PCT/CN2020/073032, dated Apr. 8, 2020, 4 pages.

(Continued)

*Primary Examiner* — Sai Aung
(74) *Attorney, Agent, or Firm* — KDW Firm PLLC

(57) ABSTRACT

Provided are a client signal transmission method, apparatus and system and a computer-readable storage medium. The method includes mapping a client signal into a predetermined container corresponding to the client signal; mapping the predetermined container into the corresponding number of first code blocks in a payload area of an optical transport network frame and inserting special idle code blocks during the mapping for rate compensation, where the first code blocks are obtained by dividing the payload area of the optical transport network frame; and sending the optical transport network frame carrying the predetermined container and configuration information of the predetermined container.

18 Claims, 7 Drawing Sheets

(56) References Cited

U.S. PATENT DOCUMENTS

| | | | | |
|---|---|---|---|---|
| 2010/0061725 A1* | 3/2010 | Jiang | ..................... | H04J 3/1658 |
| | | | | 398/45 |
| 2010/0086300 A1* | 4/2010 | Jiang | ..................... | H04L 69/08 |
| | | | | 370/466 |
| 2010/0098415 A1* | 4/2010 | Jiang | ................. | H04L 12/40032 |
| | | | | 398/45 |
| 2018/0098076 A1* | 4/2018 | Su | ......................... | H04J 3/1658 |
| 2018/0145782 A1* | 5/2018 | Yin | ..................... | H04L 25/4908 |
| 2022/0393787 A1* | 12/2022 | Liu | ....................... | H04J 3/1658 |

FOREIGN PATENT DOCUMENTS

| | | |
|---|---|---|
| CN | 101651512 A | 2/2010 |
| CN | 101325465 B | 10/2010 |
| CN | 101651512 B | 6/2013 |
| EP | 2154868 A1 | 6/2008 |
| EP | 3297196 A1 | 6/2016 |
| WO | 2017070851 A1 | 5/2017 |

OTHER PUBLICATIONS

Office Action for the Chinese Application No. 2019100807545, dated Jan. 27, 2022, 14 pages.
Search Report for the Chinese Application No. 2019100807545, dated Jan. 27, 2022, 3 pages.
The European Search Report and Written Opinion dated Oct. 12, 2022, for Application No. EP20748035 (11 pages).
Johnson et al., "Optical Transport Networks from TDM to Packet", ITU-T Manual 2010; ITU-T Draft; Study Period 2009-2012, International Telecommunication Union, Geneva, CH, pp. 91-122 (2011).

* cited by examiner

CLIENT SIGNAL TRANSMISSION METHOD, DEVICE AND SYSTEM AND COMPUTER-READABLE STORAGE MEDIUM

CROSS-REFERENCE TO RELATED APPLICATIONS

This is a National Stage Application filed under 35 U.S.C. 371 based on International Patent Application No. PCT/CN2020/073032, filed on Jan. 19, 2020, which claims priority to Chinese Patent Application No. 201910080754.5 filed on Jan. 28, 2019, the disclosures of both of which are incorporated herein by reference in their entireties.

TECHNICAL FIELD

Embodiments of the present disclosure relate to, but are not limited to, the field of communications and, in particular, to a client signal transmission method, apparatus and system and a computer-readable storage medium.

BACKGROUND

As important standards for optical transmission devices, optical transport network (OTN) standards are formulated by the International Telecommunication Union Telecommunication Standardization Sector (ITU-T). Currently, almost all long-distance transmission networks are composed of devices that are based on optical transport network standards.

Optical transport network has standard signal formats including optical channel transport unit (OTU)k (k=1, 2, 3 and 4) signals, flexible optical transport network (FlexO) signals and future-defined new optical transport network signals.

The preceding optical transport network signals are used for carrying various non-OTN signals or multiple low-rate optical channel data unit (ODU)i (i=1, 2, 2e, 3, 4 and flex) signals. ODUi signals have a lower rate than ODUk signals. Hereinafter, low-rate ODUi (i<k) signals represent ODUi signals having a lower rate than ODUk signals. Non-OTN signals refer to various other signals besides OTN signals, for example, synchronous digital hierarchy (SDH) signals, Ethernet signals, fibre channel (FC) signals and packet signals.

An OTN signal includes an overhead and a payload. Using OTUk as an example, FIG. 1 is a diagram of a relationship between an OTUk frame, an ODUk frame, an OPUk frame and an OPUk payload. An OUTk signal is composed of OUTk frames. After the OTUk overhead is removed from the OUTk frame, the remaining part is referred to as the ODUk frame. After the ODUk overhead is removed from the ODUk frame, the remaining part is referred to as the optical channel payload unit (OPU)k frame. After the OPUk overhead is removed from the OPUk frame, the remaining part is referred to as the OPUk payload. The OPUk payload is used for carrying one non-OTN signal or multiple low-rate ODUi (i<k) signals. A signal composed of ODUk frames is referred to as an ODUk signal.

In the definition of an OTN, a method for transmitting multiple traffic signals is to divide the payload of an OTN signal into N slots and then load the traffic signals into one or more slots in the payload of the OTN signal. The slots are implemented by byte intertexture.

According to the OTN G.709 standard, the minimum slot granularity of the OTN technology in the related art is 1.25 G. This slot granularity incurs serious bandwidth waste when traffic lower than 1.25 G (such as fast ethernet (FE), synchronous transfer module-1 (STM-1) and E1) is carried. For example, a 2 M E1 signal loaded into a 1.25 G slot incurs a bandwidth waste rate of over 99%.

SUMMARY

Embodiments of the present disclosure provide a client signal transmission method, apparatus and system and a computer-readable storage medium that are capable of reducing bandwidth waste.

An embodiment of the present disclosure provides a client signal transmission method. The method includes mapping a client signal into a predetermined container corresponding to the client signal; mapping the predetermined container to the corresponding number of first code blocks in a payload area of an optical transport network frame and inserting special idle code blocks during the mapping for rate compensation, where the first code blocks are obtained by dividing the payload area of the optical transport network frame; and sending the optical transport network frame carrying at least one predetermined container and configuration information of the at least one predetermined container.

An embodiment of the present disclosure provides a client signal transmission method. The method includes acquiring an optical transport network frame, where the optical transport network frame carries a predetermined container and configuration information of the predetermined container; demapping, based on the configuration information of the predetermined container, a client signal data stream from first code blocks corresponding to the predetermined container in a payload area of the optical transport network frame, where the first code blocks are obtained by dividing the payload area of the optical transport network frame; identifying and deleting a special code block in the client signal data stream to obtain the predetermined container; and performing frame alignment on the predetermined container and acquiring a client signal from a payload of the predetermined container.

An embodiment of the present disclosure provides a client signal transmission apparatus. The apparatus includes a first mapping module, a second mapping module and a sending module.

The first mapping module is configured to map a client signal into a predetermined container corresponding to the client signal.

The second mapping module is configured to map the predetermined container into a corresponding number of first code blocks in a payload area of an optical transport network frame and insert special idle code blocks during the mapping for rate compensation, where the first code blocks are obtained by dividing the payload area of the optical transport network frame.

The sending module is configured to send the optical transport network frame carrying at least one predetermined container and configuration information of the at least one predetermined container.

An embodiment of the present disclosure provides a client signal transmission apparatus. The apparatus includes a first acquisition module, a demapping module and a second acquisition module.

The first acquisition module is configured to acquire an optical transport network frame, where the optical transport network frame carries a predetermined container and configuration information of the predetermined container.

The demapping module is configured to demap, based on the configuration information of the predetermined container, a client signal data stream from first code blocks corresponding to the predetermined container in a payload area of the optical transport network frame, where the first code blocks are obtained by dividing the payload area of the optical transport network frame; and identify and delete a special code block in the client signal data stream to obtain the predetermined container.

The second acquisition module is configured to perform frame alignment on the predetermined container and acquire a client signal from a payload of the predetermined container.

An embodiment of the present disclosure provides a client signal transmission apparatus. The apparatus includes a processor and a computer-readable storage medium. The computer-readable storage medium stores instructions which, when executed by the processor, cause the processor to perform any preceding client signal transmission method.

An embodiment of the present disclosure provides a computer-readable storage medium. The computer-readable storage medium stores a computer program which, when executed by a processor, causes the processor to perform any preceding client signal transmission method.

An embodiment of the present disclosure provides a client signal transmission system. The system includes a first node and a second node.

The first node is configured to map a client signal into a predetermined container corresponding to the client signal; map the predetermined container into a corresponding number of first code blocks in a payload area of an optical transport network frame and insert special idle code blocks during the mapping for rate compensation; and send the optical transport network frame carrying at least one predetermined container and configuration information of the at least one predetermined container, where the first code blocks are obtained by dividing the payload area of the optical transport network frame.

The second node is configured to acquire an optical transport network frame, where the optical transport network frame carries a predetermined container and configuration information of the predetermined container; demap, based on the configuration information of the predetermined container, a client signal data stream from first code blocks corresponding to the predetermined container in a payload area of the optical transport network frame; and identify and delete a special code block in the client signal data stream to obtain the predetermined container; and perform frame alignment on the predetermined container and acquire a client signal from a payload of the predetermined container.

Embodiments of the present disclosure include mapping a client signal into a predetermined container corresponding to the client signal; mapping the predetermined container to the corresponding number of first code blocks in a payload area of an optical transport network frame and inserting special idle code blocks during the mapping for rate compensation, where the first code blocks are obtained by dividing the payload area of the optical transport network frame; and sending the optical transport network frame carrying at least one predetermined container and configuration information of the at least one predetermined container. In embodiments of the present disclosure, the payload area of the optical transport network frame is divided into first code blocks, and the client signal is transmitted based on the first code blocks. In this manner, bandwidth waste is reduced.

DETAILED DESCRIPTION

Embodiments of the present disclosure are described in detail hereinafter in conjunction with the drawings. It is to be noted that if not in collision, the embodiments and features therein in the present disclosure may be combined with each other.

The steps illustrated in the flowcharts among the drawings may be performed by, for example, a computer system capable of executing a set of computer-executable instructions. Moreover, although logical sequences are illustrated in the flowcharts, the illustrated or described steps may be performed in sequences different from those described herein in some cases.

Figure 1:
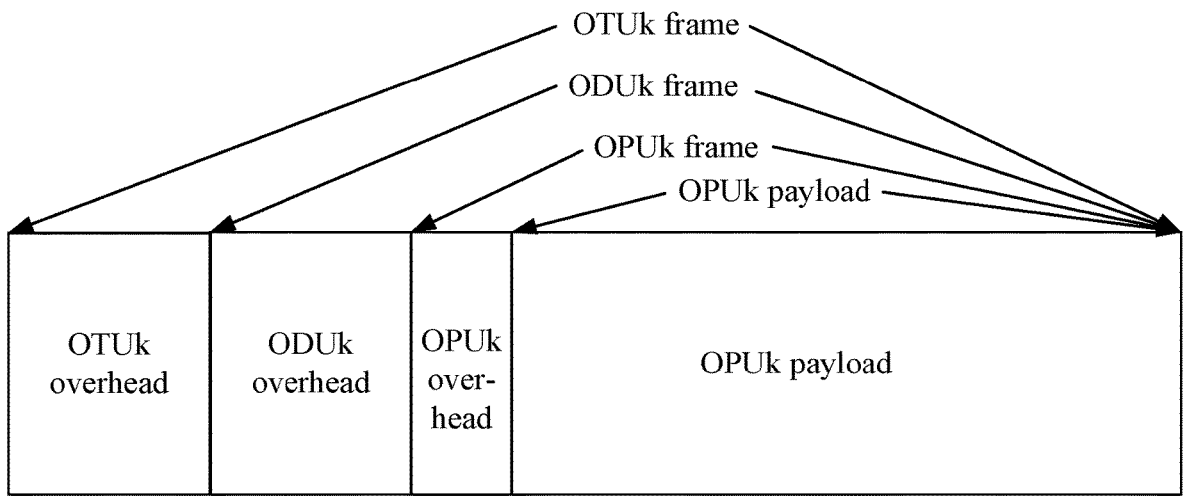
FIG. 1 is a diagram of an OTUk frame structure in the related art.
Figure 2:
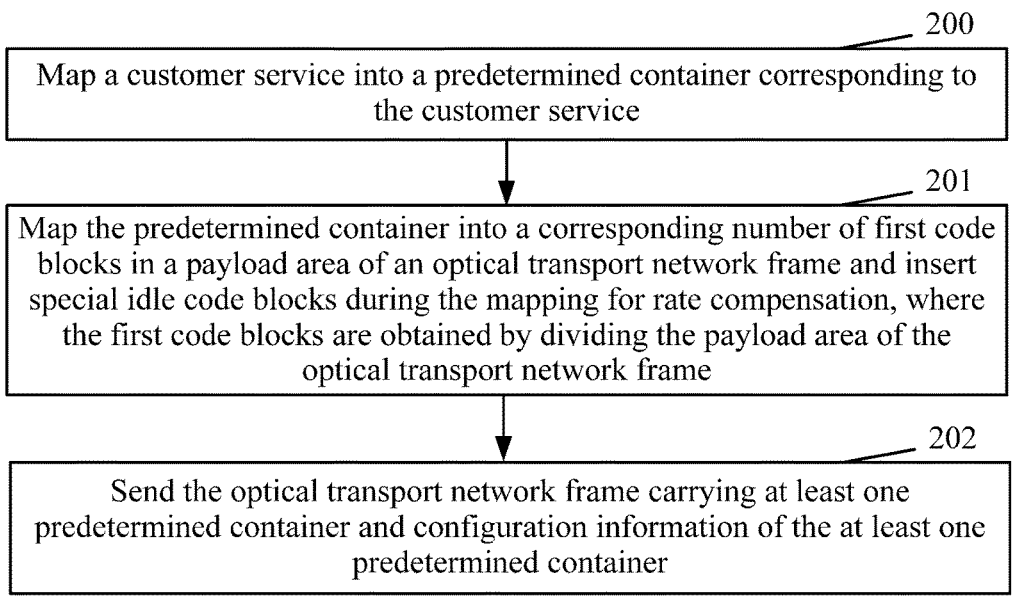
FIG. 2 is a flowchart of a client signal transmission method according to an embodiment of the present disclosure.

Referring to FIG. 2, another embodiment of the present disclosure provides a client signal transmission method. The method includes the steps below.

In step 200, a client signal is mapped into a predetermined container corresponding to the client signal.

In this embodiment of the present disclosure, the predetermined container includes one of an optical service unit (OSU) container or an ODU container.

In this embodiment of the present disclosure, the predetermined container includes N second code blocks, and the second code blocks include overhead code blocks and payload code blocks.

The number of the second code blocks in the predetermined container is obtained based on at least the following parameters: the bandwidth of the client signal, a coding coefficient, the period of the predetermined container, the number of the overhead code blocks in the second code blocks in the predetermined container, and the length of one second code block.

The number of the second code blocks in the predetermined container may be calculated based on the preceding parameters in any manner. For example, the number of the second code blocks in the predetermined container is calculated by using the formula $$B \times a \times T \times \frac{n}{n-m} = nL.$$

B denotes the bandwidth of the client signal. a denotes the coding coefficient. T denotes the period of the predetermined container. m denotes the number of the overhead code blocks in the second code blocks in the predetermined container. n denotes the number of the second code blocks in the predetermined container. L denotes the length of one second code block.

Of course, the number of the second code blocks in the predetermined container may be calculated in another manner. This calculation manner is not intended to limit the scope of embodiments of the present disclosure.

One second code block has a fixed length, for example, 66b, 257b or 512b. Different code block types have different formats.

One overhead code block includes a synchronization header, a frame header block type code and other information (such as path monitoring information, protection switching information, multiframe indication information and reserved bytes).

The synchronization header is used for indicating whether a code block is an overhead code block or a payload code block.

The frame header block type code is used for framing processing.

One payload code block includes a synchronization header and carried data.

In this embodiment of the present disclosure, one client signal corresponds to one predetermined container.

In this embodiment of the present disclosure, the client signal is mapped to the predetermined container corresponding to the client signal in the manner below.

The client signal is encoded or transcoded according to a predetermined coding format, and the encoded or transcoded client signal is mapped to the predetermined container corresponding to the client signal according to a bit synchronization mapping procedure.

Alternatively, the client signal is mapped to the predetermined container corresponding to the client signal according to the bit synchronization mapping procedure.

For example, the client signal is mapped to the predetermined container corresponding to the client signal according to the bit synchronization mapping procedure.

For another example, the client signal is encoded or transcoded according to a predetermined coding format, and the encoded or transcoded client signal is mapped to the predetermined container corresponding to the client signal according to a bit synchronization mapping procedure. For example, X client signal bits are converted into a P-bit data block. That is, each X client signal bits are added with (P-X)-bit code information. In this case, the signal rate after the encoding is as follows: client signal rate×(P/X). The ratio of the predetermined container to the payload code blocks in the predetermined container is r. For example, the predetermined container is composed of P-bit data blocks. An overhead block is used as a frame header of the predetermined container and is identified through a special type. In this case, the rate of the predetermined container is as follows: client signal rate×(P/X)×r.

For another example, when the client signal is a non-Ethernet signal, the client signal is encoded according to a predetermined coding format, and the encoded client signal is mapped to the predetermined container corresponding to the client signal according to a bit synchronization mapping procedure; and when the client signal is an Ethernet signal, the client signal is transcoded to a predetermined coding format, and the transcoded client signal is mapped to the predetermined container corresponding to the client signal according to a bit synchronization mapping procedure.

For another example, when the client signal is a non-Ethernet signal, the client signal is encoded according to a predetermined coding format, and the encoded client signal is mapped to the predetermined container corresponding to the client signal according to a bit synchronization mapping procedure; and when the client signal is an Ethernet signal, the client signal is mapped to the predetermined container corresponding to the client signal according to the bit synchronization mapping procedure.

In step 201, the predetermined container is mapped into a corresponding number of first code blocks in a payload area of an optical transport network frame, and special idle code blocks is inserted during the mapping so that rate adjustment is performed, where the first code blocks are obtained by dividing the payload area of the optical transport network frame.

In this embodiment of the present disclosure, the optical transport network frame may be any optical transport network frame, for example, an ODUk frame, a FlexO frame or a newly defined optical transport network frame.

In this embodiment of the present disclosure, one second code block has a fixed length, for example, 66b, 257b or 512b. Different code block types have different formats.

In this embodiment of the present disclosure, when the payload area of the optical transport network frame is divided, if the length of the payload area of the optical transport network frame is not an integer multiple of the length of one first code block, fixed-bit stuffing is performed. For example, the size of the payload area of an OTN frame is 4×3808 bytes, that is, 121856 bits. The payload area may be divided into L P-bit first code blocks plus Q-bit stuffing. The bandwidth of each P-bit first code block is (P/121856)× OTN frame payload bandwidth. Bits for stuffing can carry some overheads.

In this embodiment of the present disclosure, the predetermined container is mapped into a corresponding number of first code blocks in the payload area of the optical transport network frame in the manner below.

The number K of first code blocks required by the predetermined container is determined based on a bandwidth relationship between the predetermined container and the first code blocks. K is an integer greater than or equal to 1. K may be the minimum integer greater than the ratio of the bandwidth of the predetermined container to the bandwidth of the first code blocks.

Positions of the K first code blocks required by the predetermined container in the payload area of the optical transport network frame are determined by using a sigma-delta algorithm. It is to be noted that different predetermined containers may correspond to the same or different Ks. For example, assuming that the payload area of the optical transport network frame includes M first code blocks, then when the positions of the K first code blocks required by the predetermined container in the payload area of the optical transport network frame are determined, the positions of the K first code blocks occupied by a first predetermined container and located in M first code blocks in the payload area of the optical transport network frame are calculated by using the sigma-delta algorithm, the positions of the K first code blocks occupied by a second predetermined container and located in (M-K) first code blocks in the payload area of the optical transport network frame are calculated by using the sigma-delta algorithm, and the rest is done in the same manner until determination of the positions of the K first code blocks of all predetermined containers is completed.

The predetermined container is mapped to the positions of the K first code blocks corresponding to the predetermined container in the payload area of the optical transport network frame.

The positions of the K first code blocks required by the predetermined container in the payload area of the optical transport network frame are determined by using the sigma-delta algorithm in the manner below.

At least one predetermined container is sorted.

The positions of the K first code blocks required by each predetermined container in the payload area of the optical transport network frame are determined in the sorted order and by using the sigma-delta algorithm.

The at least one predetermined container may be sorted according to any rule. For example, the at least one predetermined container may be sorted in descending order of bandwidth corresponding to the at least one predetermined container. The combination of this sort manner and the sigma-delta algorithm enables bandwidth homogenization in the payload area of the optical transport network frame.

The bandwidth of the K first code blocks is greater than or equal to the bandwidth of the corresponding predetermined container.

In this embodiment of the present disclosure, the special idle code block has a particular format that can be distinguished from an overhead code block and a payload code block in the predetermined container. For example, a P-bit idle code block is inserted.

In step 202, the optical transport network frame carrying at least one predetermined container and configuration information of the at least one predetermined container is sent.

In this embodiment of the present disclosure, the configuration information of the predetermined container includes the serial number of the predetermined container, the first number of the first code blocks occupied by the predetermined container, and clock information of the predetermined container.

In this embodiment of the present disclosure, the optical transport network frame may be mapped to a high-order container and sent out from a corresponding interface.

The high-order container may be a high-order (HO) ODUk. The interface may be an OTUk interface or a FlexO interface.

Figure 4:
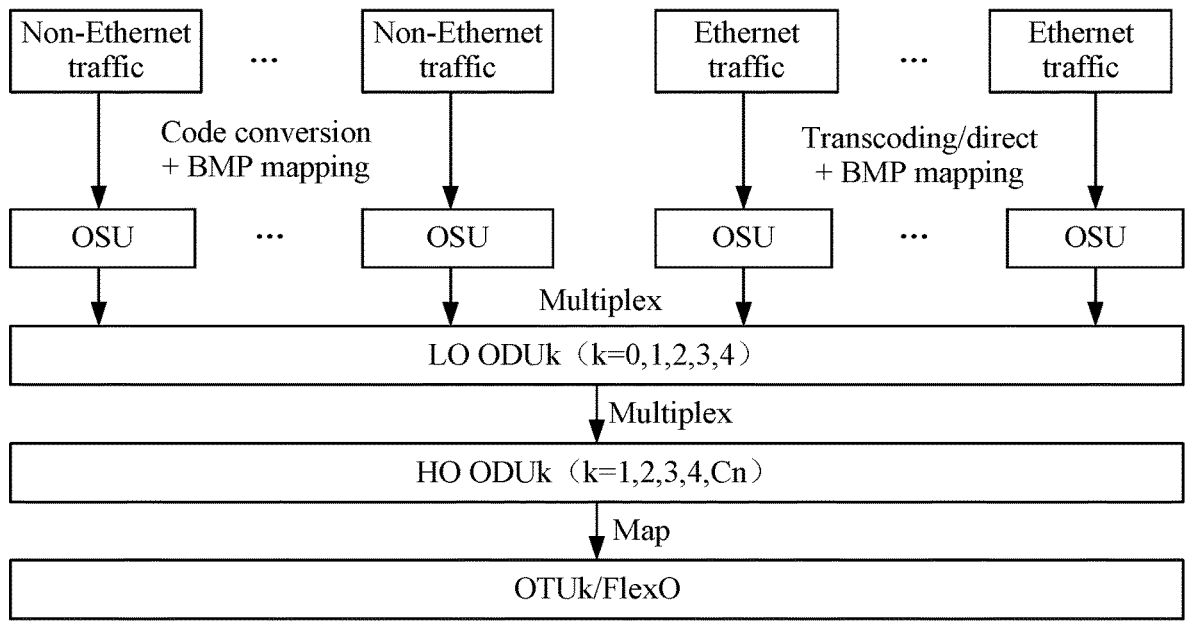
FIG. 4 is a diagram illustrating mapping and multiplexing paths of client signals according to an embodiment of the present disclosure.

As shown in FIG. 4, the client signal is mapped to an OSU, the OSU is mapped into a corresponding number of first code blocks in the payload area of a low-order (LO) ODUk (that is, an optical transport network frame), and LO ODUk is mapped to HO ODUk and sent through an OTUk interface or a FlexO interface. k in HO ODUk is greater than k in LO ODUk. k in OTUk is equal to k in HO ODUk. k denotes an order. For example, ODU1 denotes a first-order ODU container, and Cn denotes an order of 100.

In this embodiment of the present disclosure, the payload area of the optical transport network frame is divided into first code blocks, and the client signal is transmitted based on the first code blocks. In this manner, bandwidth waste is reduced.

Figure 3:
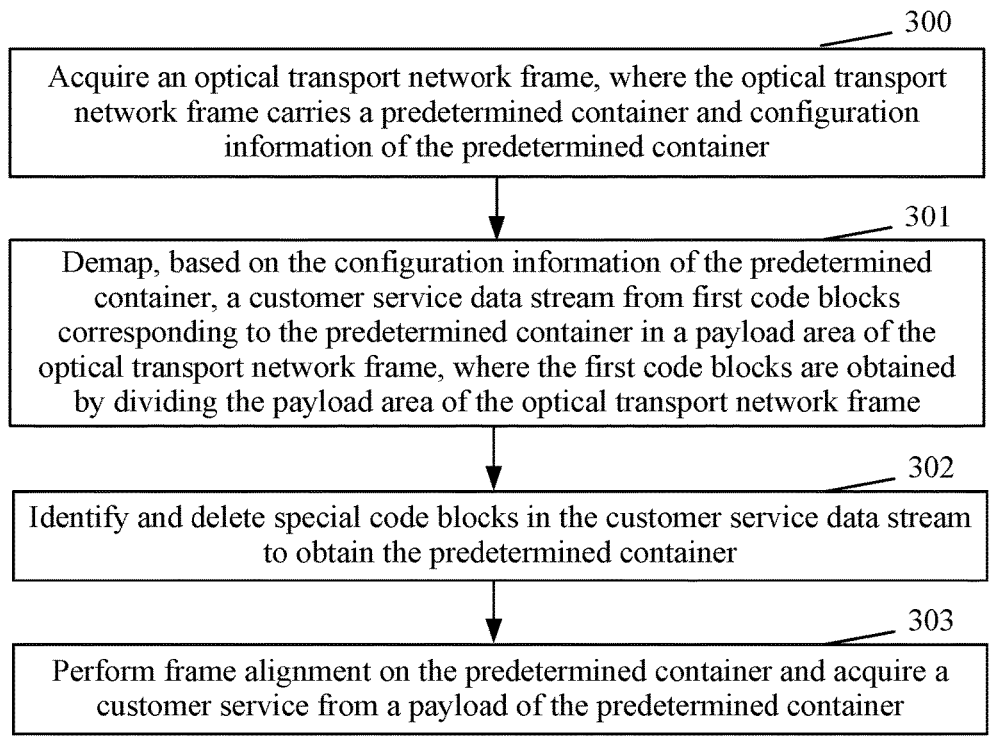
FIG. 3 is a flowchart of a client signal transmission method according to another embodiment of the present disclosure.

Referring to FIG. 3, another embodiment of the present disclosure provides a client signal transmission method. The method includes the steps below.

In step 300, an optical transport network frame is acquired, where the optical transport network frame carries a predetermined container and configuration information of the predetermined container.

In this embodiment of the present disclosure, a high-order container is received from a corresponding interface, and the high-order container is demapped so that the optical transport network frame is obtained.

The high-order container may be an HO ODUk. The interface may be an OTUk interface or a FlexO interface.

In step 301, based on the configuration information of the predetermined container, a client signal data stream is demapped from first code blocks corresponding to the predetermined container in a payload area of the optical transport network frame, where the first code blocks are obtained by dividing the payload area of the optical transport network frame.

In this embodiment of the present disclosure, based on the configuration information of the predetermined container, the client signal data stream is demapped from the first code blocks corresponding to the predetermined container in the payload area of the optical transport network frame in the manner below.

The number K of the first code blocks occupied by the predetermined container is acquired based on the configuration information of the predetermined container.

Positions of the K first code blocks occupied by the predetermined container in the payload area of the optical transport network frame are determined by using a sigma-delta algorithm. The positions of the K first code blocks occupied by the predetermined container in the payload area of the optical transport network frame need to be determined in a sorted order corresponding to a sending end and by using a sigma-delta algorithm.

The signal data stream is extracted from the K first code blocks corresponding to the determined positions in the payload area of the optical transport network frame.

In step 302, a special code block in the client signal data stream is identified and deleted so that the predetermined container is obtained.

In this embodiment of the present disclosure, the special code block has a particular format that can be distinguished from an overhead code block and a payload code block in the predetermined container. For example, the special code block includes at least one of a special idle code block (for example, a P-bit idle code block) or a code block carrying clock information of the predetermined container. The code block carrying the clock information of the predetermined container has a special code-block-type code that can be distinguished from an overhead code block and a special idle code block in the predetermined container.

In step 303, the predetermined container is framed, and a client signal is acquired from a payload of the predetermined container.

In this embodiment of the present disclosure, the client signal is acquired from the payload of the predetermined container in the manner below.

The client signal data stream is extracted from the payload of the predetermined container, and the client signal data stream is decoded or transcoded according to a predetermined coding format so that the client signal is obtained.

Alternatively, the client signal data stream is extracted from the payload of the predetermined container so that the client signal is obtained.

For example, the client signal data stream is extracted from the payload of the predetermined container so that the client signal is obtained.

For another example, the client signal data stream is extracted from the payload of the predetermined container, and the client signal data stream is decoded according to a predetermined coding format so that the client signal is obtained.

For another example, when the client signal is a non-Ethernet signal, the client signal data stream is extracted from the payload of the predetermined container, and the client signal data stream is decoded according to a predetermined coding format so that the client signal is obtained; and when the client signal is an Ethernet signal, the client signal data stream is extracted from the payload of the predetermined container, and the client signal data stream is transcoded according to a predetermined coding format so that the client signal is obtained.

For another example, when the client signal is a non-Ethernet signal, the client signal data stream is extracted from the payload of the predetermined container, and the client signal data stream is decoded according to a predetermined coding format so that the client signal is obtained; and when the client signal is an Ethernet signal, the client signal data stream is extracted from the payload of the predetermined container so that the client signal is obtained.

Embodiments of the present disclosure are described in detail hereinafter by using examples. The examples are not intended to limit the scope of embodiments of the present disclosure. Repeated description is not given here.

EXAMPLE ONE

Figure 5:
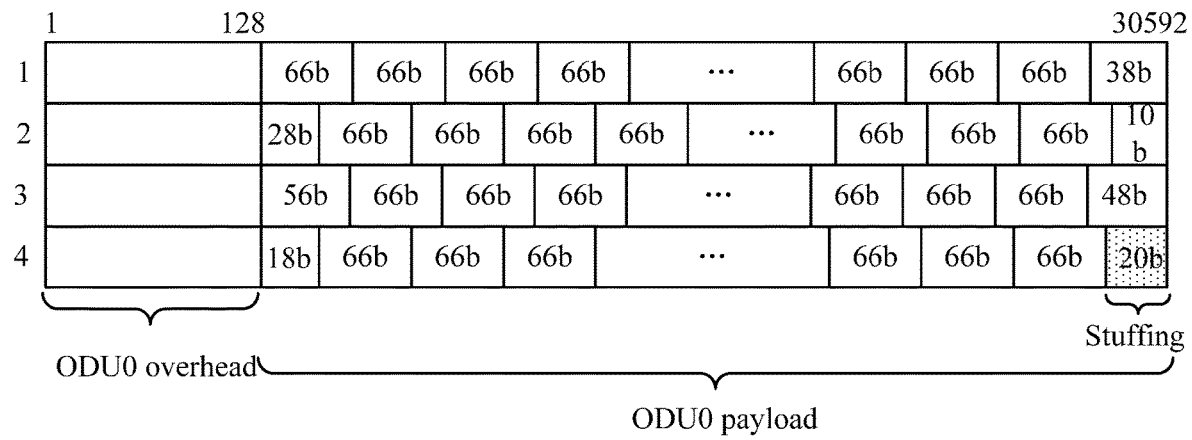
FIG. 5 is a diagram of an ODU0 payload area divided into 66b code blocks according to an embodiment of the present disclosure.

In this example, three VC12 signals having a bandwidth of 2.24 Mbit/s are transmitted between two OTN devices via an OTU2, the payload area of a related ODU0 is divided into 1846 66b code blocks (that is, the preceding first code blocks), and 20 bits are located at the end of the payload area and used for stuffing. See FIG. 5.

In step 1, at a sending end, each VC12 signal is 64b/66b encoded, that is, each 64 VC12 bits are added with a two-bit (01) synchronization header to form a 66b code block. The rate after the encoding is 2.24 Mbits/s*66/64=2.31 Mbit/s.

Figure 6:
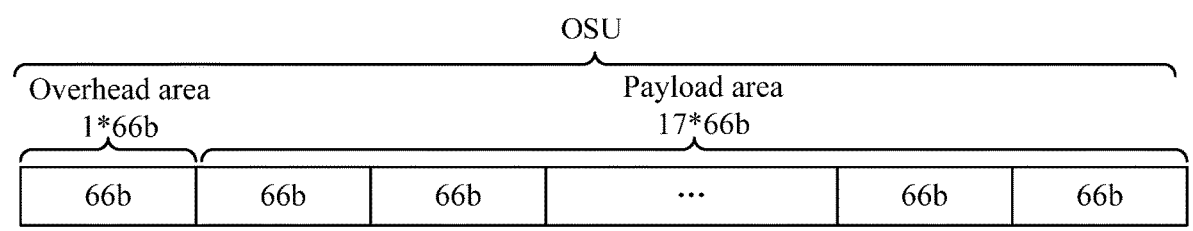
FIG. 6 is a diagram of an OSU frame structure according to example one of embodiments of the present disclosure.
Figure 6:
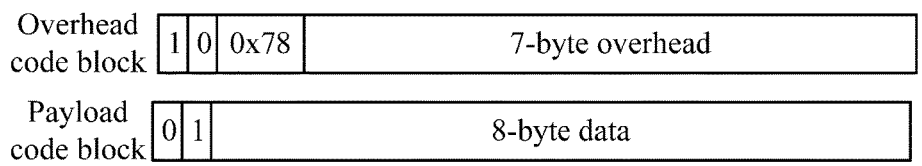

In step 2, the encoded VC12 signal bits are mapped to an OSU in a bit-synchronous mapping procedure (BMP). The OSU is composed of 18 (a multiframe of VC12 contains 140 bytes, the VC12 overhead occurs every 500 us, and the OSU overhead occurs at the same frequency as VC12; therefore, 18 is used as the length of the OSU) 66b code blocks. The first 66b code block is an overhead. The frame header is identified by a synchronization header of 10 and a block type code 0x78. The bandwidth of the OSU is 2.31 Mbit/s*18/17=2.446 Mbit/s. The frame structure is shown in FIG. 6. According to the formula B*66/64*T*n/(n−1)=n*66, n=18. B denotes the bandwidth of VC12. T denotes the period of the OSU (that is, 500 us).

In step 3, in the ODU0, the bandwidth of each 66b code block is 1.24416 Gbit/s*66/(4*3824*8)=0.671 Mbit/s. 1.24416 Gbit/s is the bandwidth of the ODU0. 4*3824*8 is the number of bits of the ODU0 frame.

Figure 7:
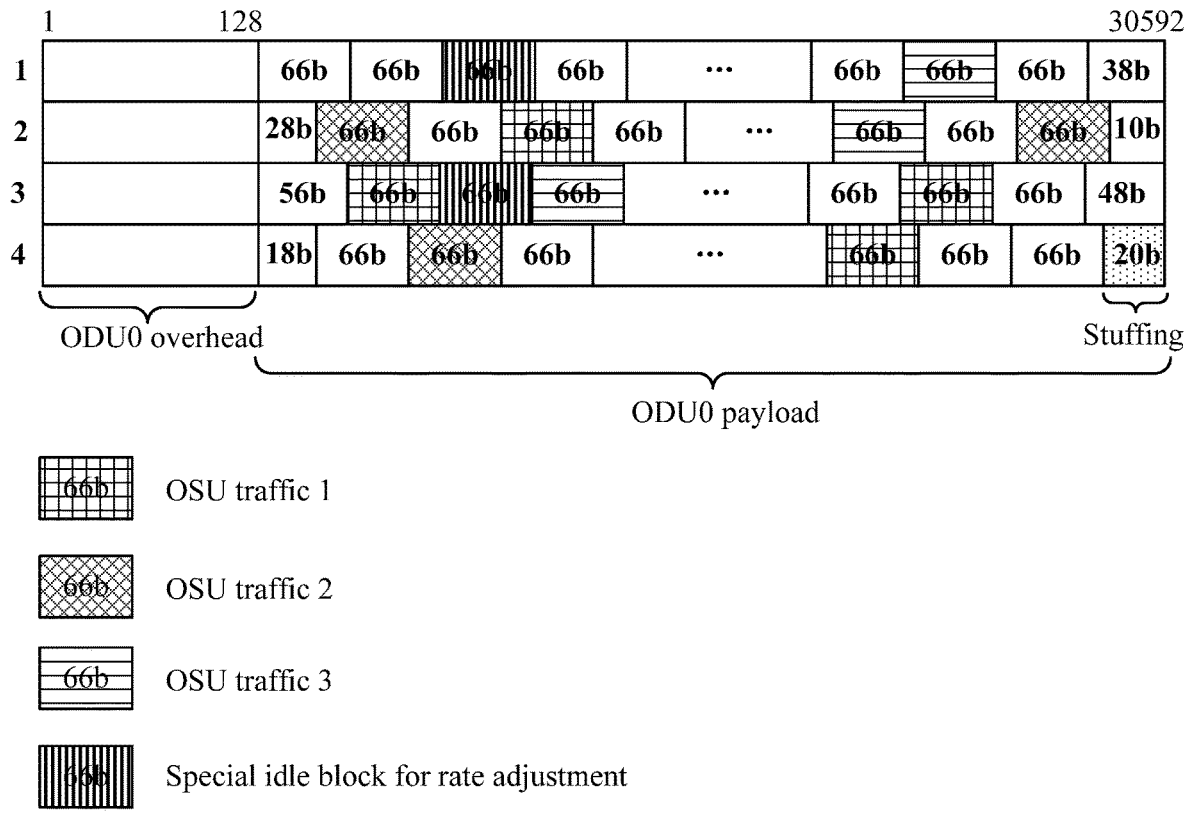
FIG. 7 is a diagram illustrating the distribution of three OSU signals in an ODU0 payload area according to example one of embodiments of the present disclosure.

In step 4, it is known from the relationship between the bandwidth of the OSU and each 66b code block in the ODU0 that each OSU occupies four 66b code blocks. The positions of the four 66b code blocks occupied by a first OSU in the 1846 66b code blocks in the ODU0 are calculated by using a sigma-delta algorithm. Similarly, the positions of the four 66b code blocks occupied by a second OSU in the (1846-4) 66b code blocks in the ODU0 are calculated, and the positions of the four 66b code blocks occupied by a third OSU in the (1846-4*2) 66b code blocks in the ODU0 are calculated. These code blocks stored are shown in FIG. 7.

In step 5, since the bandwidth 4*0.671 Mbit/s=2.684 Mbit/s of the four 66b code blocks in the ODU0 is greater than the bandwidth of the OSU, when the OSU is mapped to the four 66b code blocks, a 66b idle code block needs to be inserted for rate adjustment. The IEEE802.3 standard can be used as the coding specification of the idle code block. The synchronization header of the idle code block is 10. The code-block-type code of the idle code block is 0x1E.

In step 6, the ODU0 is mapped to a time slot of an ODU2, mapped to the OTU2 and then sent out through an interface.

Figure 8:
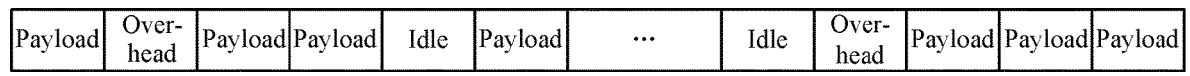
FIG. 8 is a diagram of an OSU data stream and idle blocks according to an embodiment of the present disclosure.
Figure 8:
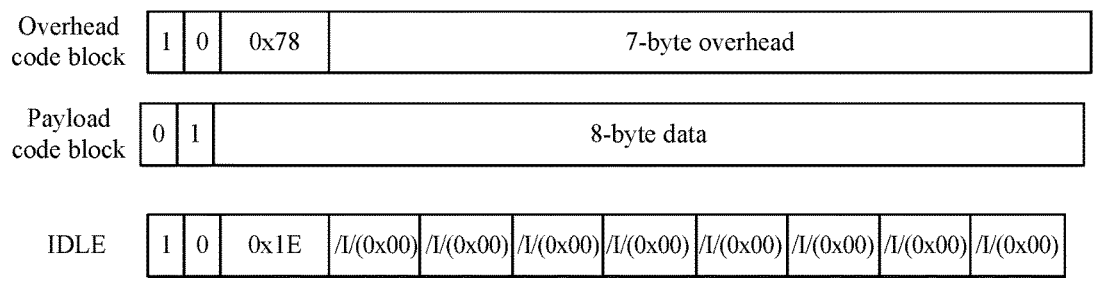

In step 7, at a receiving end, the ODU0 is demapped from the OTU2, a signal data stream is extracted from the four 66b code blocks at the corresponding positions in the ODU0, as shown in FIG. 8, and the idle code block is identified and deleted from the signal data stream so that the OSU is obtained.

In step 8, the OSU is framed, and the encoded client signal data stream is demapped from the payload of the OSU and then decoded, that is, a 2-bit synchronization header is removed from each 66 bits so that a VC12 signal is obtained.

EXAMPLE TWO

Figure 9:
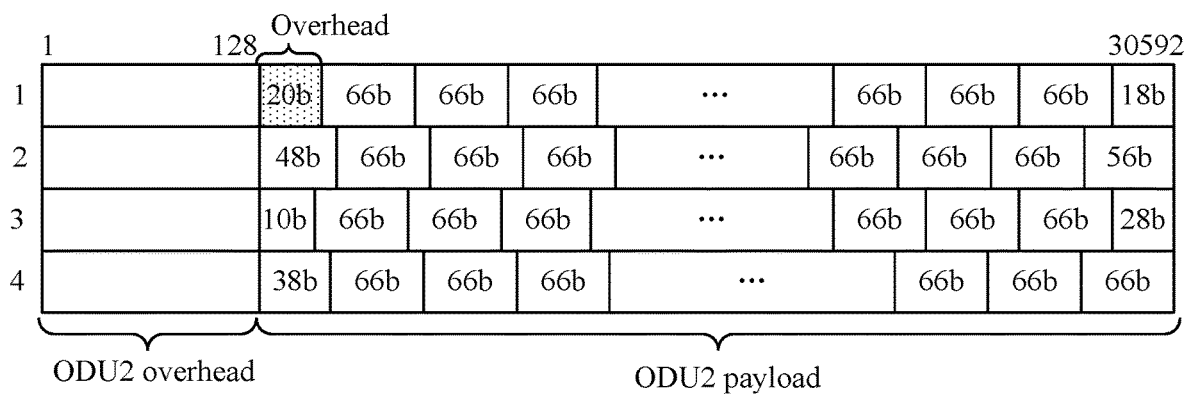
FIG. 9 is a diagram of an ODU2 payload area divided into 66b code blocks according to an embodiment of the present disclosure.

In this example, two VC4 signals having a bandwidth of 150.336 Mbit/s are transmitted between two OTN devices via an OTU4, the payload area of a related ODU2 is divided into 1846 66b code blocks, and 20 bits are located at the beginning of the payload area and used for overhead. See FIG. 9.

In step 1, at a sending end, each VC4 signal is 64b/66b. The rate after the encoding is 150.336 Mbits/s*66/64=155.034 Mbit/s.

Figure 10:
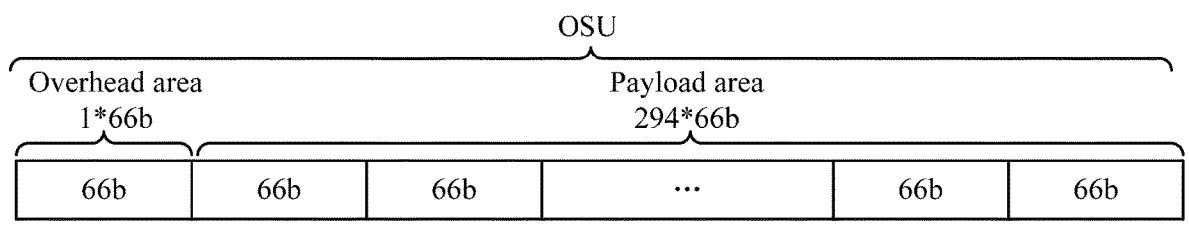
FIG. 10 is a diagram of an OSU frame structure according to example two of embodiments of the present disclosure.
Figure 10:
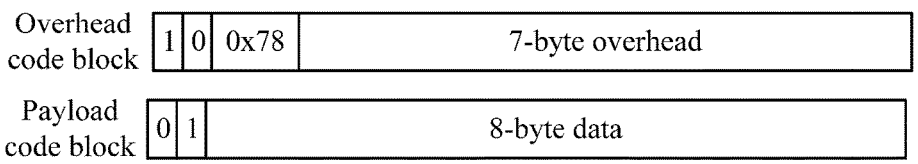

In step 2, the encoded VC4 signal bits are mapped to an OSU in a BMP. The OSU is composed of 295 (the VC4 overhead occurs every 125 us, so an OSU size of 295 ensures that the OSU overhead occurs at the same frequency as VC4). The first 66b code block is an overhead. The frame header is identified by a synchronization header of 10 and a block type code 0x78. The bandwidth of the OSU is 155.034 Mbit/s*295/294=155.562 Mbit/s. The frame structure is shown in FIG. 10.

In step 3, in the ODU2, the bandwidth of each 66b code block is 10.037273924 Gbit/s*66/(4*3824*8)=5.413 Mbit/s. 10.037273924 Gbit/s is the bandwidth of the ODU2. 4*3824*8 is the number of bits of the ODU2 frame.

Figure 11:
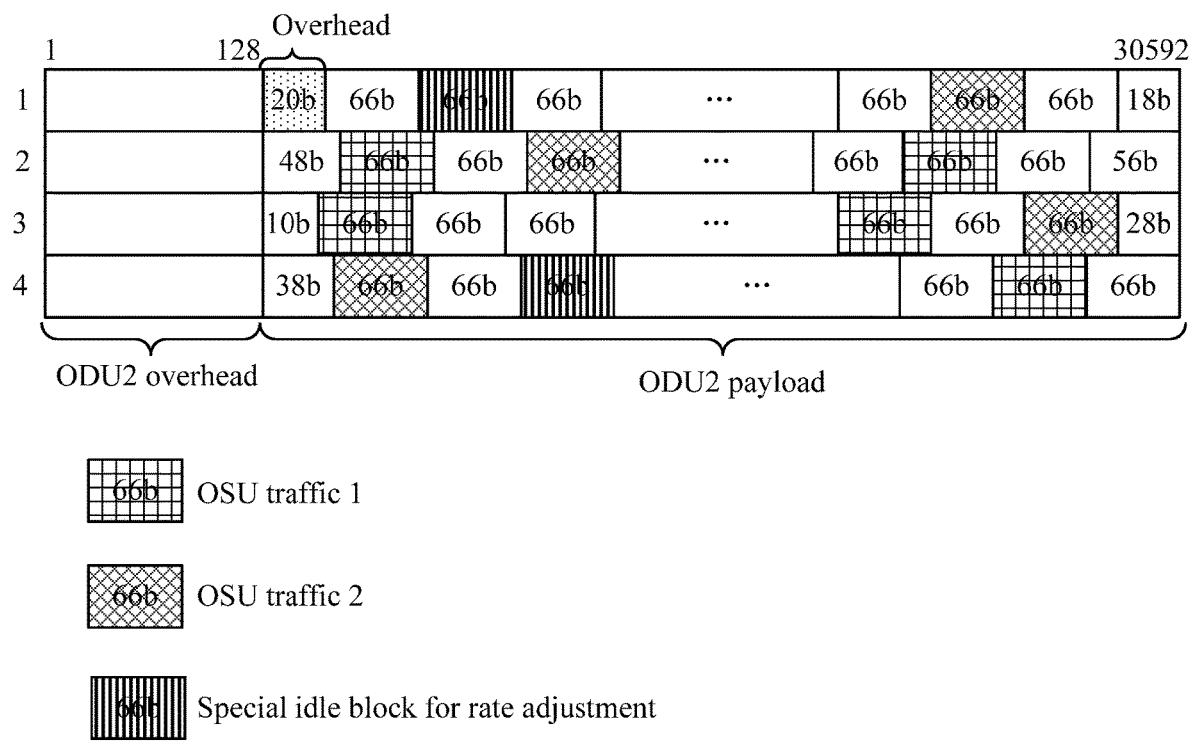
FIG. 11 is a diagram illustrating the distribution of two OSU signals in an ODU2 payload area according to example two of embodiments of the present disclosure.

In step 4, it is known from the relationship between the bandwidth of the OSU and each 66b code block in the ODU2 that each OSU occupies 29 66b code blocks. The positions of the 29 66b code blocks occupied by a first OSU in the 1846 66b code blocks in the ODU2 are calculated by using a sigma-delta algorithm. Similarly, the positions of the 29 66b code blocks occupied by a second OSU in the (1846-29) 66b code blocks in the ODU0 are calculated. These code blocks stored are shown in FIG. 11.

In step 5, since the bandwidth 29*5.413 Mbit/s=156.977 Mbit/s of the 29 66b code blocks in the ODU2 is greater than the bandwidth of the OSU, when the OSU is mapped to the 29 66b code blocks, a 66b idle code block needs to be inserted for rate adjustment. The IEEE802.3 standard can be used as the coding specification of the idle code block. The synchronization header of the idle code block is 10. The code-block-type code of the idle code block is 0x1E.

In step 6, the ODU0 is mapped to an ODU4, mapped to the OTU4 and then sent out through an interface.

In step 7, at a receiving end, the ODU2 is demapped from the OTU4, a signal data stream is extracted from the 29 66b code blocks at the corresponding positions in the ODU2, as shown in FIG. 7, and the idle code block is identified and deleted from the signal data stream so that the OSU is obtained.

In step 8, the OSU is framed, and the encoded client signal data stream is demapped from the payload of the OSU and then decoded, that is, a 2-bit synchronization header is removed from each 66 bits so that a VC4 signal is obtained.

Figure 12:
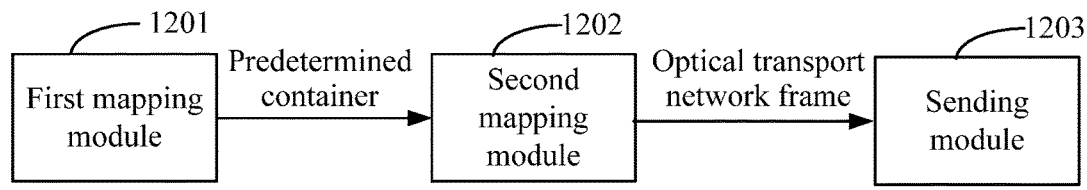
FIG. 12 is a diagram illustrating the structure of a client signal transmission apparatus according to another embodiment of the present disclosure.

Referring to FIG. 12, another embodiment of the present disclosure provides a client signal transmission apparatus. The apparatus includes a first mapping module 1201, a second mapping module 1202 and a sending module 1203.

The first mapping module 1201 is configured to map a client signal into a predetermined container corresponding to the client signal.

The second mapping module 1202 is configured to map the predetermined container into a corresponding number of first code blocks in a payload area of an optical transport network frame and insert special idle code blocks during the mapping for rate compensation, where the first code blocks are obtained by dividing the payload area of the optical transport network frame.

The sending module 1203 is configured to send the optical transport network frame carrying at least one predetermined container and configuration information of the at least one predetermined container.

In this embodiment of the present disclosure, the predetermined container includes one of an OSU container or an ODU container.

In this embodiment of the present disclosure, the predetermined container includes N second code blocks, and the second code blocks include overhead code blocks and payload code blocks.

The number of the second code blocks in the predetermined container is obtained based on at least the following parameters: the bandwidth of the client signal, a coding coefficient, the period of the predetermined container, the number of the overhead code blocks in the second code blocks in the predetermined container, and the length of one second code block.

The number of the second code blocks in the predetermined container may be calculated based on the preceding parameters in any manner. For example, the number of the second code blocks in the predetermined container is calculated by using the formula $$B \times a \times T \times \frac{n}{n-m} = nL.$$

B denotes the bandwidth of the client signal. a denotes the coding coefficient. T denotes the period of the predetermined container. m denotes the number of the overhead code blocks in the second code blocks in the predetermined container. n denotes the number of the second code blocks in the predetermined container. L denotes the length of one second code block.

Of course, the number of the second code blocks in the predetermined container may be calculated in another manner. This calculation manner is not intended to limit the scope of embodiments of the present disclosure.

One second code block has a fixed length, for example, 66b, 257b or 512b. Different code block types have different formats.

One overhead code block includes a synchronization header, a frame header block type code and other information (such as path monitoring information, protection switching information, multiframe indication information and reserved bytes).

The synchronization header is used for indicating whether a code block is an overhead code block or a payload code block.

The frame header block type code is used for framing processing.

One payload code block includes a synchronization header and carried data.

In this embodiment of the present disclosure, one client signal corresponds to one predetermined container.

In this embodiment of the present disclosure, the first mapping module 1201 is configured to map the client signal to the predetermined container corresponding to the client signal in the manner below.

The client signal is encoded or transcoded according to a predetermined coding format, and the encoded or transcoded client signal is mapped to the predetermined container corresponding to the client signal according to a bit synchronization mapping procedure.

Alternatively, the client signal is mapped to the predetermined container corresponding to the client signal according to the bit synchronization mapping procedure.

For example, the client signal is mapped to the predetermined container corresponding to the client signal according to the bit synchronization mapping procedure.

For another example, the client signal is encoded or transcoded according to a predetermined coding format, and the encoded or transcoded client signal is mapped to the predetermined container corresponding to the client signal according to a bit synchronization mapping procedure. For example, X client signal bits are converted into a P-bit data block. That is, each X client signal bits are added with (P-X)-bit code information. In this case, the signal rate after the encoding is as follows: client signal rate x (P/X). The ratio of the predetermined container to the payload code blocks in the predetermined container is r. For example, the predetermined container is composed of P-bit data blocks. An overhead block is used as a frame header of the predetermined container and is identified through a special type. In this case, the rate of the predetermined container is as follows: client signal rate×(P/X)×r.

For another example, when the client signal is a non-Ethernet signal, the client signal is encoded according to a predetermined coding format, and the encoded client signal is mapped to the predetermined container corresponding to the client signal according to a bit synchronization mapping procedure; and when the client signal is an Ethernet signal, the client signal is transcoded to a predetermined coding format, and the transcoded client signal is mapped to the predetermined container corresponding to the client signal according to a bit synchronization mapping procedure.

For another example, when the client signal is a non-Ethernet signal, the client signal is encoded according to a predetermined coding format, and the encoded client signal is mapped to the predetermined container corresponding to the client signal according to a bit synchronization mapping procedure; and when the client signal is an Ethernet signal, the client signal is mapped to the predetermined container corresponding to the client signal according to the bit synchronization mapping procedure.

In this embodiment of the present disclosure, the optical transport network frame may be any optical transport network frame, for example, an ODUk frame, a FlexO frame or a newly defined optical transport network frame.

In this embodiment of the present disclosure, one second code block has a fixed length, for example, 66b, 257b or 512b. Different code block types have different formats.

In this embodiment of the present disclosure, when the payload area of the optical transport network frame is divided, if the length of the payload area of the optical transport network frame is not an integer multiple of the length of one first code block, fixed-bit stuffing is performed. For example, the size of the payload area of an OTN frame is 4×3808 bytes, that is, 121856 bits. The payload area may be divided into L P-bit first code blocks plus Q-bit stuffing. The bandwidth of each P-bit first code block is (P/121856)× OTN frame payload bandwidth. Bits for stuffing can carry some overheads.

In this embodiment of the present disclosure, the second mapping module 1202 is configured to map the predetermined container into a corresponding number of first code blocks in the payload area of the optical transport network frame in the manner below.

The number K of first code blocks required by the predetermined container is determined based on a bandwidth relationship between the predetermined container and the first code blocks. K is an integer greater than or equal to 1. K may be the minimum integer greater than the ratio of the bandwidth of the predetermined container to the bandwidth of the first code blocks.

Positions of the K first code blocks required by the predetermined container in the payload area of the optical transport network frame are determined by using a sigma-delta algorithm. It is to be noted that different predetermined containers may correspond to the same or different Ks. For example, assuming that the payload area of the optical transport network frame includes M first code blocks, then when the positions of the K first code blocks required by the predetermined container in the payload area of the optical transport network frame are determined, the positions of the K first code blocks occupied by a first predetermined container and located in M first code blocks in the payload area of the optical transport network frame are calculated by using the sigma-delta algorithm, the positions of the K first code blocks occupied by a second predetermined container and located in (M-K) first code blocks in the payload area of the optical transport network frame are calculated by using the sigma-delta algorithm, and the rest is done in the same manner until determination of the positions of the K first code blocks of all predetermined containers is completed.

The predetermined container is mapped to the positions of the K first code blocks corresponding to the predetermined container in the payload area of the optical transport network frame.

The second mapping module 1202 is configured to determine, by using the sigma-delta algorithm, the positions of the K first code blocks required by the predetermined container in the payload area of the optical transport network frame in the manner below.

At least one predetermined container is sorted.

The positions of the K first code blocks required by each predetermined container in the payload area of the optical transport network frame are determined in the sorted order and by using the sigma-delta algorithm.

The at least one predetermined container may be sorted according to any rule. For example, the at least one predetermined container may be sorted in descending order of bandwidth corresponding to the at least one predetermined container. The combination of this sort manner and the sigma-delta algorithm enables bandwidth homogenization in the payload area of the optical transport network frame.

The bandwidth of the K first code blocks is greater than or equal to the bandwidth of the corresponding predetermined container.

In this embodiment of the present disclosure, the special idle code block has a particular format that can be distinguished from an overhead code block and a payload code block in the predetermined container. For example, a P-bit idle code block is inserted.

In this embodiment of the present disclosure, the configuration information of the predetermined container includes the serial number of the predetermined container, the first number of the first code blocks occupied by the predetermined container, and clock information of the predetermined container.

In this embodiment of the present disclosure, the optical transport network frame may be mapped to a high-order container and sent out from a corresponding interface.

The high-order container may be an HO ODUk. The interface may be an OTUk interface or a FlexO interface.

As shown in FIG. 4, the client signal is mapped to an OSU, the OSU is mapped into a corresponding number of first code blocks in the payload area of an LO ODUk (that is, an optical transport network frame), and LO ODUk is mapped to HO ODUk and sent through an OTUk interface or a FlexO interface. k in HO ODUk is greater than k in LO ODUk. k in OTUk is equal to k in HO ODUk. k denotes an order. For example, ODU1 denotes a first-order ODU container, and Cn denotes an order of 100.

In this embodiment of the present disclosure, the payload area of the optical transport network frame is divided into first code blocks, and the client signal is transmitted based on the first code blocks. In this manner, bandwidth waste is reduced.

Figure 13:
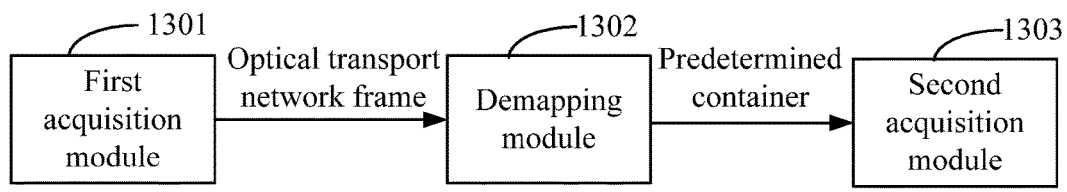
FIG. 13 is a diagram illustrating the structure of a client signal transmission apparatus according to another embodiment of the present disclosure.

Referring to FIG. 13, another embodiment of the present disclosure provides a client signal transmission apparatus. The apparatus includes a first acquisition module 1301, a demapping module 1302 and a second acquisition module 1303.

The first acquisition module 1301 is configured to acquire an optical transport network frame, where the optical transport network frame carries a predetermined container and configuration information of the predetermined container.

The demapping module 1302 is configured to demap, based on the configuration information of the predetermined container, a client signal data stream from first code blocks corresponding to the predetermined container in a payload area of the optical transport network frame, where the first code blocks are obtained by dividing the payload area of the optical transport network frame; and identify and delete a special code block in the client signal data stream to obtain the predetermined container.

The second acquisition module 1303 is configured to perform frame alignment on the predetermined container and acquire a client signal from a payload of the predetermined container.

In this embodiment of the present disclosure, the first acquisition module 1301 is configured to receive a high-order container from a corresponding interface and demap the high-order container to obtain the optical transport network frame.

The high-order container may be an HO ODUk. The interface may be an OTUk interface or a FlexO interface.

In this embodiment of the present disclosure, the demapping module 1302 is configured to demap, based on the configuration information of the predetermined container, the client signal data stream from the first code blocks corresponding to the predetermined container in the payload area of the optical transport network frame in the manner below.

The number K of the first code blocks occupied by the predetermined container is acquired based on the configuration information of the predetermined container.

Positions of the K first code blocks occupied by the predetermined container in the payload area of the optical transport network frame are determined by using a sigma-delta algorithm. The positions of the K first code blocks occupied by the predetermined container in the payload area of the optical transport network frame need to be determined in a sorted order corresponding to a sending end and by using a sigma-delta algorithm.

The signal data stream is extracted from the K first code blocks corresponding to the determined positions in the payload area of the optical transport network frame.

In this embodiment of the present disclosure, the special code block has a particular format that can be distinguished from an overhead code block and a payload code block in the predetermined container. For example, the special code block includes at least one of a special idle code block (for example, a P-bit idle code block) or a code block carrying clock information of the predetermined container. The code block carrying the clock information of the predetermined container has a special code-block-type code that can be distinguished from an overhead code block and a special idle code block in the predetermined container.

In this embodiment of the present disclosure, the first mapping module 1303 is configured to acquire the client signal from the payload of the predetermined container in the manner below.

The client signal data stream is extracted from the payload of the predetermined container, and the client signal data stream is decoded or transcoded according to a predetermined coding format so that the client signal is obtained.

Alternatively, the client signal data stream is extracted from the payload of the predetermined container so that the client signal is obtained.

For example, the client signal data stream is extracted from the payload of the predetermined container so that the client signal is obtained.

For another example, the client signal data stream is extracted from the payload of the predetermined container, and the client signal data stream is decoded according to a predetermined coding format so that the client signal is obtained.

For another example, when the client signal is a non-Ethernet signal, the client signal data stream is extracted from the payload of the predetermined container, and the client signal data stream is decoded according to a predetermined coding format so that the client signal is obtained; and when the client signal is an Ethernet signal, the client signal data stream is extracted from the payload of the predetermined container, and the client signal data stream is transcoded according to a predetermined coding format so that the client signal is obtained.

For another example, when the client signal is a non-Ethernet signal, the client signal data stream is extracted from the payload of the predetermined container, and the client signal data stream is decoded according to a predetermined coding format so that the client signal is obtained; and when the client signal is an Ethernet signal, the client signal data stream is extracted from the payload of the predetermined container so that the client signal is obtained.

Another embodiment of the present disclosure provides a client signal transmission apparatus. The apparatus includes a processor and a computer-readable storage medium. The computer-readable storage medium stores instructions which, when executed by the processor, cause the processor to perform any preceding client signal transmission method.

Another embodiment of the present disclosure provides a computer-readable storage medium. The computer-readable storage medium stores a computer program which, when executed by a processor, causes the processor to perform any preceding client signal transmission method.

Figure 14:
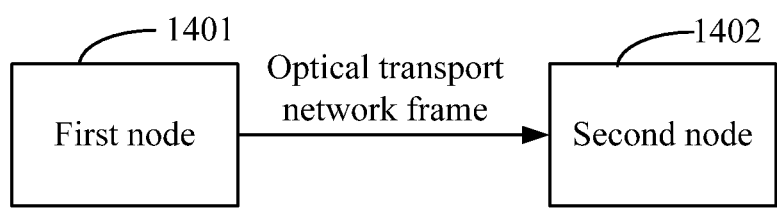
FIG. 14 is a diagram illustrating the structure of a client signal transmission system according to another embodiment of the present disclosure.

Referring to FIG. 14, another embodiment of the present disclosure provides a client signal transmission system. The system includes a first node 1401 and a second node 1402.

The first node 1401 is configured to map a client signal into a predetermined container corresponding to the client signal; map the predetermined container into a corresponding number of first code blocks in a payload area of an optical transport network frame and insert special idle code blocks during the mapping for rate compensation; and send the optical transport network frame carrying at least one predetermined container and configuration information of the at least one predetermined container, where the first code blocks are obtained by dividing the payload area of the optical transport network frame.

The second node 1402 is configured to acquire an optical transport network frame, where the optical transport network frame carries a predetermined container and configuration information of the predetermined container; demap, based on the configuration information of the predetermined container, a client signal data stream from first code blocks corresponding to the predetermined container in a payload area of the optical transport network frame; and identify and delete a special code block in the client signal data stream to obtain the predetermined container; and perform frame alignment on the predetermined container and acquire a client signal from a payload of the predetermined container.

In this embodiment of the present disclosure, the predetermined container includes one of an OSU container or an ODU container.

In this embodiment of the present disclosure, the predetermined container includes N second code blocks, and the second code blocks include overhead code blocks and payload code blocks.

One second code block has a fixed length, for example, 66b, 257b or 512b. Different code block types have different formats.

The number of the second code blocks in the predetermined container is obtained based on at least the following parameters: the bandwidth of the client signal, a coding coefficient, the period of the predetermined container, the number of the overhead code blocks in the second code blocks in the predetermined container, and the length of one second code block.

The number of the second code blocks in the predetermined container may be calculated based on the preceding parameters in any manner. The number of the second code blocks in the predetermined container may be calculated based on the preceding parameters in any manner. For example, the number of the second code blocks in the predetermined container is calculated by using the formula $$B \times a \times T \times \frac{n}{n-m} = nL.$$

B denotes the bandwidth of the client signal. a denotes the coding coefficient. T denotes the period of the predetermined container. m denotes the number of the overhead code blocks in the second code blocks in the predetermined container. n denotes the number of the second code blocks in the predetermined container. L denotes the length of one second code block.

Of course, the number of the second code blocks in the predetermined container may be calculated in another manner. This calculation manner is not intended to limit the scope of embodiments of the present disclosure.

One overhead code block includes a synchronization header, a frame header block type code and other information (such as path monitoring information, protection switching information, multiframe indication information and reserved bytes).

The synchronization header is used for indicating whether a code block is an overhead code block or a payload code block.

The frame header block type code is used for framing processing.

One payload code block includes a synchronization header and carried data.

In this embodiment of the present disclosure, one client signal corresponds to one predetermined container.

In this embodiment of the present disclosure, the first node 1401 is configured to map the client signal to the predetermined container corresponding to the client signal in the manner below.

The client signal is encoded or transcoded according to a predetermined coding format, and the encoded or transcoded client signal is mapped to the predetermined container corresponding to the client signal according to a bit synchronization mapping procedure.

Alternatively, the client signal is mapped to the predetermined container corresponding to the client signal according to the bit synchronization mapping procedure.

For example, the client signal is mapped to the predetermined container corresponding to the client signal according to the bit synchronization mapping procedure. For another example, the client signal is encoded or transcoded according to a predetermined coding format, and the encoded or transcoded client signal is mapped to the predetermined container corresponding to the client signal according to a bit synchronization mapping procedure. For example, X client signal bits are converted into a P-bit data block. That is, each X client signal bits are added with (P-X)-bit code information. In this case, the signal rate after the encoding is as follows: client signal rate x (P/X). The ratio of the predetermined container to the payload code blocks in the predetermined container is r. For example, the predetermined container is composed of P-bit data blocks. An overhead block is used as a frame header of the predetermined container and is identified through a special type. In this case, the rate of the predetermined container is as follows: client signal rate×(P/X)×r.

For another example, when the client signal is a non-Ethernet signal, the client signal is encoded according to a predetermined coding format, and the encoded client signal is mapped to the predetermined container corresponding to the client signal according to a bit synchronization mapping procedure; and when the client signal is an Ethernet signal, the client signal is transcoded to a predetermined coding format, and the transcoded client signal is mapped to the predetermined container corresponding to the client signal according to a bit synchronization mapping procedure.

For another example, when the client signal is a non-Ethernet signal, the client signal is encoded according to a predetermined coding format, and the encoded client signal is mapped to the predetermined container corresponding to the client signal according to a bit synchronization mapping procedure; and when the client signal is an Ethernet signal, the client signal is mapped to the predetermined container corresponding to the client signal according to the bit synchronization mapping procedure.

In this embodiment of the present disclosure, the optical transport network frame may be any optical transport network frame, for example, an ODUk frame, a FlexO frame or a newly defined optical transport network frame.

In this embodiment of the present disclosure, one second code block has a fixed length, for example, 66b, 257b or 512b. Different code block types have different formats.

In this embodiment of the present disclosure, when the payload area of the optical transport network frame is divided, if the length of the payload area of the optical transport network frame is not an integer multiple of the length of one first code block, fixed-bit stuffing is performed. For example, the size of the payload area of an OTN frame is 4×3808 bytes, that is, 121856 bits. The payload area may be divided into L P-bit first code blocks plus Q-bit stuffing. The bandwidth of each P-bit first code block is (P/121856)× OTN frame payload bandwidth. Bits for stuffing can carry some overheads.

In this embodiment of the present disclosure, the second mapping module 1202 is configured to map the predetermined container into a corresponding number of first code blocks in the payload area of the optical transport network frame in the manner below.

The number K of first code blocks required by the predetermined container is determined based on a bandwidth relationship between the predetermined container and the first code blocks. K is an integer greater than or equal to 1. K may be the minimum integer greater than the ratio of the bandwidth of the predetermined container to the bandwidth of the first code blocks.

Positions of the K first code blocks required by the predetermined container in the payload area of the optical transport network frame are determined by using a sigma-delta algorithm. It is to be noted that different predetermined containers may correspond to the same or different Ks. For example, assuming that the payload area of the optical transport network frame includes M first code blocks, then when the positions of the K first code blocks required by the predetermined container in the payload area of the optical transport network frame are determined, the positions of the K first code blocks occupied by a first predetermined container and located in M first code blocks in the payload area of the optical transport network frame are calculated by using the sigma-delta algorithm, the positions of the K first code blocks occupied by a second predetermined container and located in (M-K) first code blocks in the payload area of the optical transport network frame are calculated by using the sigma-delta algorithm, and the rest is done in the same manner until determination of the positions of the K first code blocks of all predetermined containers is completed.

The predetermined container is mapped to the positions of the K first code blocks corresponding to the predetermined container in the payload area of the optical transport network frame.

The first node 1401 is configured to determine, by using the sigma-delta algorithm, the positions of the K first code blocks required by the predetermined container in the payload area of the optical transport network frame in the manner below.

At least one predetermined container is sorted.

The positions of the K first code blocks required by each predetermined container in the payload area of the optical transport network frame are determined in the sorted order and by using the sigma-delta algorithm.

The at least one predetermined container may be sorted according to any rule. For example, the at least one predetermined container may be sorted in descending order of bandwidth corresponding to the at least one predetermined container. The combination of this sort manner and the sigma-delta algorithm enables bandwidth homogenization in the payload area of the optical transport network frame.

The bandwidth of the K first code blocks is greater than or equal to the bandwidth of the corresponding predetermined container.

In this embodiment of the present disclosure, the special code block has a particular format that can be distinguished from an overhead code block and a payload code block in the predetermined container. For example, the special code block includes at least one of a special idle code block (for example, a P-bit idle code block) or a code block carrying clock information of the predetermined container. The code block carrying the clock information of the predetermined container has a special code-block-type code that can be distinguished from an overhead code block and a special idle code block in the predetermined container.

In this embodiment of the present disclosure, the configuration information of the predetermined container includes the serial number of the predetermined container, the first number of the first code blocks occupied by the predetermined container, and clock information of the predetermined container.

In this embodiment of the present disclosure, the optical transport network frame may be mapped to a high-order container and sent out from a corresponding interface.

The high-order container may be an HO ODUk. The interface may be an OTUk interface or a FlexO interface.

As shown in FIG. 4, the client signal is mapped to an OSU, the OSU is mapped into a corresponding number of first code blocks in the payload area of an LO ODUk (that is, an optical transport network frame), and LO ODUk is mapped to HO ODUk and sent through an OTUk interface or a FlexO interface. k in HO ODUk is greater than k in LO ODUk. k in OTUk is equal to k in HO ODUk.

In this embodiment of the present disclosure, the second node 1402 is configured to demap, in the manner below, the optical transport network frame based on the configuration information of the predetermined container to obtain a corresponding number of first code blocks in each predetermined container.

The number K of the first code blocks occupied by the predetermined container is acquired based on the configuration information of the predetermined container.

Positions of the K first code blocks occupied by the predetermined container in the payload area of the optical transport network frame are determined by using a sigma-delta algorithm. The positions of the K first code blocks occupied by the predetermined container in the payload area of the optical transport network frame need to be determined in a sorted order corresponding to a sending end and by using a sigma-delta algorithm.

The signal data stream is extracted from the K first code blocks corresponding to the determined positions in the payload area of the optical transport network frame.

In this embodiment of the present disclosure, the second node 1402 is configured to acquire the client signal from the payload of the predetermined container in the manner below.

The client signal data stream is extracted from the payload of the predetermined container, and the client signal data stream is decoded or transcoded according to a predetermined coding format so that the client signal is obtained.

Alternatively, the client signal data stream is extracted from the payload of the predetermined container so that the client signal is obtained.

For example, the client signal data stream is extracted from the payload of the predetermined container so that the client signal is obtained.

For another example, the client signal data stream is extracted from the payload of the predetermined container, and the client signal data stream is decoded according to a predetermined coding format so that the client signal is obtained.

For another example, when the client signal is a non-Ethernet signal, the client signal data stream is extracted from the payload of the predetermined container, and the client signal data stream is decoded according to a predetermined coding format so that the client signal is obtained; and when the client signal is an Ethernet signal, the client signal data stream is extracted from the payload of the predetermined container, and the client signal data stream is transcoded according to a predetermined coding format so that the client signal is obtained.

For another example, when the client signal is a non-Ethernet signal, the client signal data stream is extracted from the payload of the predetermined container, and the client signal data stream is decoded according to a predetermined coding format so that the client signal is obtained; and when the client signal is an Ethernet signal, the client signal data stream is extracted from the payload of the predetermined container so that the client signal is obtained.

In this embodiment of the present disclosure, the payload area of the optical transport network frame is divided into first code blocks, and the client signal is transmitted based on the first code blocks. In this manner, bandwidth waste is reduced.

It is to be understood by those having ordinary skill in the art that some or all steps of the preceding method and function modules/units in the preceding system or device may be implemented as software, firmware, hardware and suitable combinations thereof. In the hardware implementation, the division of the preceding function modules/units may not correspond to the division of physical components. For example, one physical component may have multiple functions, or one function or step may be performed jointly by several physical components. Some or all physical components may be implemented as software executed by a processor such as a digital signal processor or a microprocessor, may be implemented as hardware, or may be implemented as integrated circuits such as application-specific integrated circuits. Such software may be distributed over computer-readable media. The computer-readable media may include computer storage media (or non-transitory media) and communication media (or transitory media). As is known to those having ordinary skill in the art, the term computer storage media include volatile and non-volatile as well as removable and non-removable media implemented in any method or technology for storing information (such as computer-readable instructions, data structures, program modules or other data). The computer storage media include, but are not limited to, a random-access memory (RAM), a read-only memory (ROM), an electrically erasable programmable read-only memory (EEPROM), a flash memory or other memory technologies, a portable compact disc read-only memory (CD-ROM), a digital versatile disc (DVD) or other optical storages, a magnetic cassette, a magnetic tape, a magnetic disk or other magnetic storage devices, or any other medium for storing desired information that can be accessed by a computer. Moreover, as is known to those having ordinary skill in the art, communication media generally include computer-readable instructions, data structures, program modules, or other data in carriers or in modulated data signals transported in other transport mechanisms and may include any information delivery medium.

What is claimed is:

1. A client signal transmission method, comprising:
mapping a client signal into a predetermined container corresponding to the client signal;
mapping the predetermined container into a corresponding number of first code blocks in a payload area of an optical transport network frame and inserting special idle code blocks during the mapping for rate compensation, wherein the first code blocks are obtained by dividing the payload area of the optical transport network frame; and
sending the optical transport network frame carrying the predetermined container and configuration information of the predetermined container,
wherein the predetermined container comprises second code blocks, and the second code blocks comprises overhead code blocks and payload code blocks.

2. The method of claim 1, wherein a number of the second code blocks in the predetermined container is obtained based on at least following parameters:
a bandwidth of the client signal, a coding coefficient, a period of the predetermined container, a number of overhead code blocks among the second code blocks in the predetermined container, and a length of the second code block.

3. The method of claim 1, wherein each of the overhead code blocks comprises a synchronization header, a frame header block type code and other information, wherein the other information comprises path monitoring information, protection switching information, multiframe indication information and reserved bytes.

4. The method of claim 1, wherein at least one of each of the first code blocks or each of the second code blocks has a fixed length.

5. The method of claim 4, wherein the fixed length comprises any one of 66 bits, 257 bits or 512 bits.

6. The method of claim 1, wherein the configuration information of the predetermined container comprises a serial number of the predetermined container, a first number of the first code blocks occupied by the predetermined container, and clock information of the predetermined container.

7. The method of claim 1, wherein mapping the client signal to the predetermined container corresponding to the client signal comprises:
encoding or transcoding the client signal according to a predetermined coding format, and mapping encoded client signal or transcoded client signal into the predetermined container corresponding to the client signal according to a bit synchronization mapping procedure; or mapping the client signal directly to the predetermined container corresponding to the client signal according to a bit synchronization mapping procedure.

8. The method of claim 1, wherein mapping the predetermined container to the corresponding number of the first code blocks in the payload area of the optical transport network frame comprises:
determining, according to a bandwidth relationship between the predetermined container and the first code block, a number K of the first code blocks required by the predetermined container, wherein K is an integer greater than or equal to 1;
determining, by using a sigma-delta algorithm, positions of the K first code blocks required by the predetermined container in the payload area of the optical transport network frame; and
mapping the predetermined container to the positions of the K first code blocks corresponding to the predetermined container in the payload area of the optical transport network frame.

9. The method of claim 8, wherein determining, by using the sigma-delta algorithm, the positions of the K first code blocks required by the predetermined container in the payload area of the optical transport network frame comprises:
sorting at least one predetermined container; and
determining, by using the sigma-delta algorithm, the positions of the K first code blocks required by each of the at least one predetermined container in the payload area of the optical transport network frame in turn according to a sorted order.

10. The method of claim 9, wherein sorting the at least one predetermined container comprises:
sorting the at least one predetermined container in a descending order according to a bandwidth corresponding to the at least one predetermined container.

11. A client signal transmission method, comprising:
acquiring an optical transport network frame, wherein the optical transport network frame carries a predetermined container and configuration information of the predetermined container;
demapping, according to the configuration information of the predetermined container, a client signal data stream from first code blocks corresponding to the predetermined container in a payload area of the optical transport network frame, wherein the first code blocks are obtained by dividing the payload area of the optical transport network frame;
identifying and deleting special code blocks in the client signal data stream to obtain the predetermined container; and
performing frame alignment on the predetermined container and acquiring a client signal from a payload area of the predetermined container,
wherein the predetermined container comprises second code blocks, and the second code blocks comprises overhead code blocks and payload code blocks.

12. The method of claim 11, wherein the special code block comprises at least one of a special idle code block or a code block carrying clock information of the predetermined container.

13. The method of claim 11, wherein demapping, based on the configuration information of the predetermined container, the signal data stream from the first code blocks corresponding to the predetermined container in the payload area of the optical transport network frame comprises:

acquiring, according to the configuration information of the predetermined container, a number K of the first code blocks occupied by the predetermined container;

determining, by using a sigma-delta algorithm, positions of the K first code blocks occupied by the predetermined container in the payload area of the optical transport network frame; and extracting the signal data stream from the K first code blocks corresponding to the determined positions in the payload area of the optical transport network frame.

14. The method of claim 11, wherein acquiring the client signal from the payload of the predetermined container comprises:

extracting the client signal data stream from the payload of the predetermined container, and decoding or transcoding the client signal data stream according to a predetermined coding format to obtain the client signal; or extracting the client signal data stream from the payload of the predetermined container to obtain the client signal directly.

15. A client signal transmission apparatus, comprising:

a processor and a memory storing processor-executable instructions which, when executed by the processor, are configured to:

map a client signal into a predetermined container corresponding to the client signal;

map the predetermined container into a corresponding number of first code blocks in a payload area of an optical transport network frame and insert special idle code blocks during the mapping for rate compensation, wherein the first code blocks are obtained by dividing the payload area of the optical transport network frame; and send the optical transport network frame carrying the predetermined container and configuration information of the predetermined container, wherein the predetermined container comprises second code blocks, and the second code blocks comprises overhead code blocks and payload code blocks.

16. A client signal transmission apparatus, comprising a processor and a computer-readable storage medium, wherein the computer-readable storage medium stores instructions which, when executed by the processor, cause the processor to perform the client signal transmission method of claim 11.

17. A computer-readable storage medium, wherein the computer-readable storage medium stores a computer program which, when executed by a processor, causes the processor to perform the client signal transmission method of claim 1.

18. A computer-readable storage medium, wherein the computer-readable storage medium stores a computer program which, when executed by a processor, causes the processor to perform the client signal transmission method of claim 11.

* * * * *